United States Patent Office 2,694,670
Patented Nov. 16, 1954

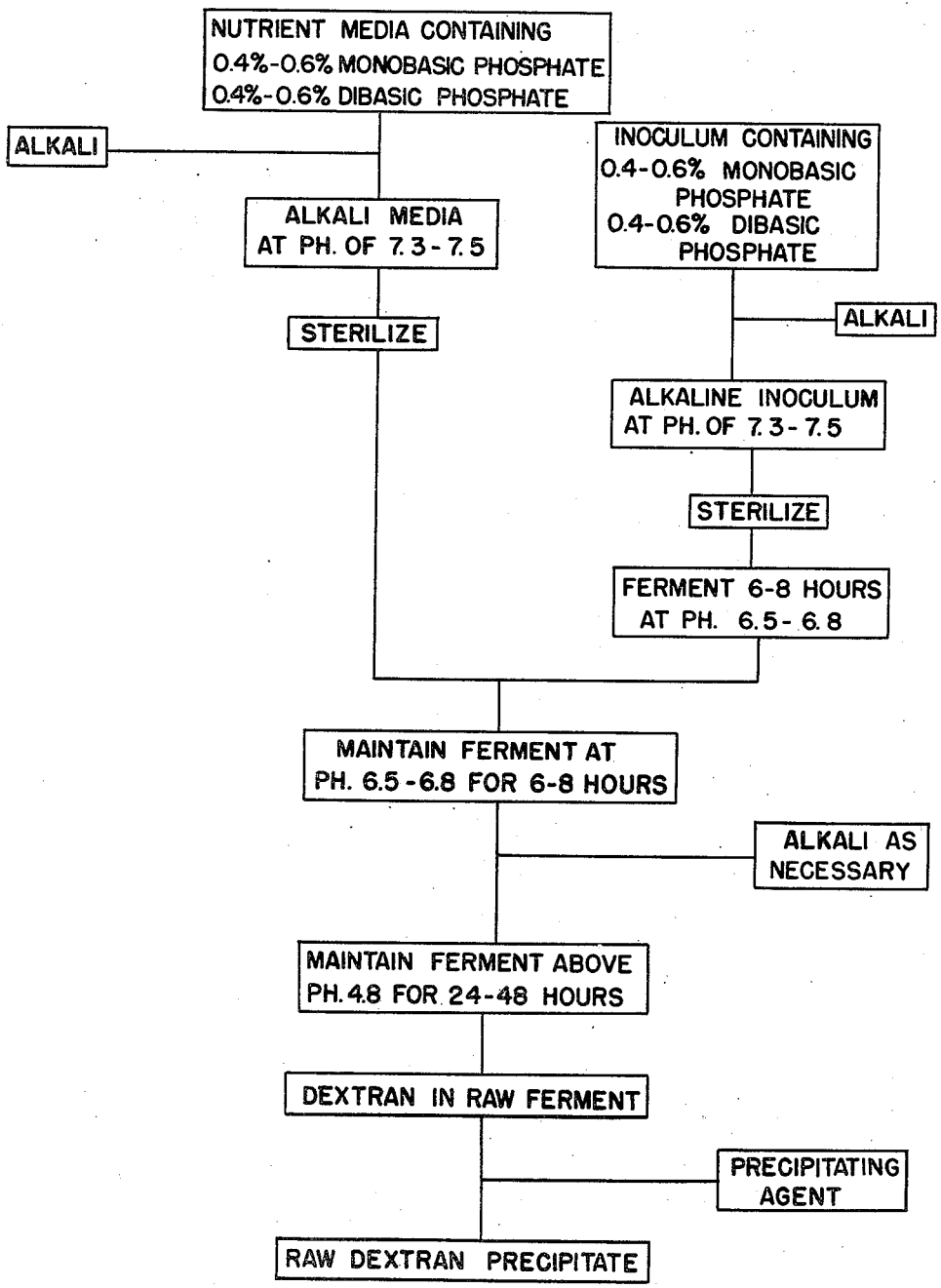

2,694,670

BUFFERING OF DEXTRAN FERMENTATIONS

George S. Stoycos, Dayton, Ohio, assignor to The Commonwealth Engineering Company of Ohio, Dayton, Ohio, a corporation of Ohio Application November 23, 1951, Serial No. 257,825

5 Claims. (Cl. 195—31)

This invention relates to an improved process for the production of dextran.

Dextran produced by the action of micro-organisms such as Leuconostoc mesenterioides or Leuconostoc dextranicum on nutrient media containing carbohydrates, such as refined sugar, raw sugar, molasses or other sucrose bearing materials, when hydrolyzed or partially depolymerized to an average molecular weight in the range of 30,000 to 200,000 has the desirable property, after careful purification, of maintaining blood volume and is particularly effective in the treatment of shock. This use as a substitute blood plasma volume expander stems from the physico-chemical properties of the dextran. The prior art products however, are deficient as to purity, turbidity in solution, and in particular the range of molecular weights varies excessively.

In the fermentation process the bacterial action normally leads to the production of the dextran polymer and side action promote the development of fructose, thus decreasing the availability of the sucrose for dextran formation. In the course of the fermentation a dextran producing enzyme is formed which assists in maintaining a good dextran yield.

However, it has now been discovered that if enzyme production is fostered in the ferment that enzymatic and bacterial action taking place in concert within the ferment lead to improved yields.

It is accordingly an object of this invention to provide a method of dextran formation in which bacterial and enzymatic action in concert in the ferment provide for improved yields of dextran.

This and other allied objectives of the invention are attained by providing for maximum formation of dextran enzyme under controlled conditions of pH in an inoculum, and then introducing the inoculum into the main ferment under controlled conditions of pH at which the enzyme is most stable. The pH of the main ferment when inoculated may of itself assume the proper pH range for effective action of the enzyme and be controlled there for a period of time which permits the formation of high dextran yield.

The controlled pH conditions are attained by providing in the inoculum and in the main ferment also two specific buffering agents in a particular range of concentrations. The buffering agents are monobasic potassium phosphate and di-basic potassium phosphate, each having a concentration in the inoculum and main ferment of 0.4% to 0.6% by weight, the preferred method including having the phosphates present in equal concentrations.

The product of the fermentation under the conditions noted will be raw dextran which may then be treated as described in co-pending application, Serial No. 240,579, filed August 6, 1951, of George S. Stoycos and Leo J. Novak, for production of hydrolyzed dextran.

The invention will be more fully understood by reference to the accompanying flow sheet and the following specific examples.

Example I

A nutrient medium may first be formed containing by weight:

| | Per cent |
|---|---|
| Sucrose | 20 |
| Casein hydrolysate | 0.5 |
| $K_2HPO_4$ | 0.5 |
| $KH_2PO_4$ | 0.5 |
| Sodium chloride | 0.2 |
| Yeast extract | 0.1 |
| Manganous sulphate | .0022 |
| $H_2O$ | Balance |

About 10% by weight of this medium which has a pH of about 6.4–6.6 is then utilized to serve as the basis of the inoculum, the 10% portion being first made alkaline to a pH of about 7.3–7.5 with a 40% NaOH solution and then sterilized, whereafter the organism Leuconostoc mesenterioides may be introduced thereto.

The inoculum will drop slowly in pH over a period of about 16 hours to the pH range of 6.5–6.8. The presence of the buffers then serve to maintain this latter pH range substantially automatically for about 6–8 hours and during this time optimum formation of dextran producing enzyme will take place, the dual buffers preventing excessive variation of pH in the fluid.

The main portion of the nutrient medium may then be made alkaline with a 40% solution of sodium hydroxide in water to a pH of about 7.3–7.5, sterilized, and the 10% inoculum added thereto. The pH of the medium will then fall gradually as fermentation proceeds but should not be permitted to fall below 6.5 during the first 6 to 8 hours, which is the critical period for action of the dextran enzyme. If necessary 40% NaOH may be added during this period to limit the pH drop. Normally only very small amounts, if any, of the alkali will be required.

After the initial 6–8 hour fermentation period the pH may be allowed to drop naturally, during an additional 24–48 hour period, to complete the fermentation. At the end of this time the pH will normally be in the range of 4.8–5.1 at which pH the enzyme is at maximum stability. Also the pH will have been in about the range of maximum stability over the greater portion of the additional fermentation period.

The fermentations may be most effectively carried out at a temperature in the range of about 23–27° C.

Hydrolyzed dextran may then be recovered from the raw ferment by precipitating out the raw dextran with an agent such as isopropyl alcohol and proceeding as set forth in the above identified application. The per cent of theoretical yield of dextran from the sugar is about 75–80.

Example II

The procedure may be the same as set forth in Example I except that the concentration of each of the phosphates in the medium and inoculum is about .4% by weight.

The buffering action at this lower concentration is less than in the first example, evidently leading to a lower degree of enzyme formation and slightly lower final yields.

Example III

The procedure may be the same as in the previous examples except that the concentrations of each of the buffers may be about .6% by weights in each of the inoculum and nutrient medium.

The buffering action at this higher phosphate concentration offers no apparent advantage over the concentration used in Example I.

As understood the mechanism involved is that normally the organism, Leuconostoc mesenterioides, acting on the sugar produces through bacterial action, dextran, and acids, which acid formation exists to such an extent that dextran formation is inhibited to some degree. Also enzyme formation while it may occur to a slight extent is also largely prevented. However, in the presence of the phosphates, at the noted concentrations the pH changes due to the acids formed do not develop to the same degree, and dextran enzyme as well as dextran formation is improved.

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions, without necessarily departing from the spirit of this disclosure and the scope of the appended claims.

I claim:

1. A process for producing raw dextran comprising the steps of preparing an inoculum by introducing the organism *Leuconostoc mesenterioides* into a sterile solution of a sucrose bearing nutrient containing, by weight, from 0.4% to 0.6% of monobasic potassium phosphate and from 0.4% to 0.6% of di-basic potassium phosphate, and having a pH between about 7.3 and 7.5, holding the inoculated solution until the pH thereof drops naturally to the range between about 6.5 and 6.8 and is stabilized in said range by the buffering action of the mixed monobasic and di-basic potassium phosphates present therein, holding the solution at the stabilized pH between 6.5 and 6.8 for about 6–8 hours to thereby foster the formation of an optimum amount of dextran producing enzyme in the solution, thereafter adding said solution to a sterile solution of a sucrose-bearing nutrient medium containing, by weight, between 0.4% and 0.6% of monobasic potassium phosphate and between 0.4% and 0.6% of di-basic potassium phosphate and having a pH between about 7.3 and 7.5 to cause fermentation of the combined solutions for mass dextran production, holding the combined solutions while the pH thereof is maintained at 6.5 to 6.8 for about 6–8 hours by the buffering action of the phosphates, and continuing the fermentation for an additional 24–48 hours.

2. A process for producing raw dextran comprising the steps of forming a culture of *Leuconostoc mesenterioides* by inoculating a sterile solution of a sucrose bearing nutrient containing, by weight, from 0.4% to 0.6% of monobasic potassium phosphate and from 0.4% to 0.6% of di-basic potassium phosphate, the phosphates being present in substantially equal amounts, and having a pH between about 7.3 and 7.5, holding the inoculated solution until the pH thereof drops naturally to the range between about 6.5 and 6.8 and is stabilized in said range by the buffering action of the mixed monobasic and di-basic potassium phosphates present therein, holding the solution at the stabilized pH between 6.5 and 6.8 for about 6–8 hours to thereby foster the formation of an optimum amount of dextran producing enzyme in the solution, thereafter adding said solution to a sucrose-bearing nutrient medium in which mass dextran is to be synthesized and containing, by weight, equal amounts between 0.4% and 0.6% of monobasic potassium phosphate and di-basic potassium phosphate and having initially a pH between about 7.3 and 7.5 to cause fermentation of the combined solutions, while the pH of the combined solutions is maintained at 6.5 to 6.8 as a result of the buffering action of the mono- and di-basic potassium phosphates for about 6–8 hours, and continuing the fermentation for an additional 24–48 hours.

3. In a process for the production of dextran the steps of forming an inoculum by introducing a dextran-producing Leuconostoc microorganism into a nutrient medium comprising sucrose and from 0.4% to 0.6% by weight each of mono- and di-basic potassium phosphates and having, initially, a pH between 7.3 and 7.5, fermenting the same while the pH is maintained at between 6.5 and 6.8 for 6 to 8 hours as a result of the buffering action of the phosphates, adding the inoculum to a sucrose-bearing nutrient medium containing from 0.4% to 0.6% by weight each of mono- and di-basic potassium phosphates and having, initially, a pH of about 7.3 to 7.5, for mass dextran production, and allowing fermentation to proceed at a pH maintained between 6.5 and 6.8 as a result of the buffering action of the phosphates for about 6 to 8 hours.

4. The method of claim 3 in which the mono- and di-basic potassium phosphates are present in equal amounts between 0.4% and 0.6% by weight in both the nutrient medium for the Leuconostoc and the nutrient medium for mass dextran production.

5. In a process for the production of dextran the steps of forming an inoculum by introducing a dextran-producing Leuconostoc microorganism into a nutrient medium comprising sucrose and from 0.4% to 0.6% by weight each of mono- and di-basic potassium phosphates and having, initially, a pH between 7.3 and 7.5, fermenting the same while the pH is maintained at between 6.5 and 6.8 for 6 to 8 hours as a result of the buffering action of the phosphates, adding the inoculum to a sucrose bearing nutrient medium containing from 0.4% to 0.6% by weight each of mono- and di-basic potassium phosphates and having, initially, a pH of about 7.3 to 7.5, for mass dextran production, allowing fermentation to proceed at a pH maintained between 6.5 and 6.8 as a result of the buffering action of the phosphate for about 6 to 8 hours and then continuing the fermentation for an additional 24–48 hours.

References Cited in the file of this patent

UNITED STATES PATENTS

| Number | Name | Date |
| --- | --- | --- |
| 2,310,263 | Staley | Feb. 9, 1943 |
| 2,392,258 | Owen et al. | Jan. 1, 1946 |
| 2,488,248 | Vander Brook | Nov. 15, 1949 |
| 2,565,507 | Lockwood | Aug. 28, 1951 |

FOREIGN PATENTS

| Number | Country | Date |
| --- | --- | --- |
| 634,129 | Great Britain | Mar. 15, 1950 |

OTHER REFERENCES

Hassid et al.: Jour. Biol. Chem., 134 (1940), article, pages 163–170; page 165.

Evans et al.: Bacterial Polysaccharides, SRS No. 6, Sugar Research Foundation, Inc., N. Y.; April 1947, pages 210–211.

Hehre et al.: Jour. Bact., 55 (1948), article, pages 197–208; page 202.